United States Patent [19]
Gräber et al.

[11] Patent Number: 6,106,421
[45] Date of Patent: Aug. 22, 2000

[54] UNCOUPLED BELT PULLEY

[75] Inventors: Stefan Gräber, Schliengen; Peter Barsch, Auggen, both of Germany

[73] Assignee: Firma Carl Freudenberg, Weinheim, Germany

[21] Appl. No.: 09/189,649

[22] Filed: Nov. 10, 1998

[30]     Foreign Application Priority Data

Nov. 11, 1997 [DE] Germany .................. 197 49 761

[51] Int. Cl.⁷ .................. F16F 15/12; F16H 55/14
[52] U.S. Cl. .................. 474/94; 74/574
[58] Field of Search .................. 474/94, 166, 135, 474/86; 74/574

[56]     References Cited

U.S. PATENT DOCUMENTS

| | | | |
|---|---|---|---|
| 4,781,659 | 11/1988 | Gebhardt | 474/94 |
| 5,449,322 | 9/1995 | Wagner | 74/574 X |
| 5,591,093 | 1/1997 | Asai et al. | 474/94 |
| 5,637,041 | 6/1997 | Hameaekers et al. | 474/94 |

*Primary Examiner*—Thomas R. Hannon
*Attorney, Agent, or Firm*—Kenyon & Kenyon

[57]     ABSTRACT

An uncoupled belt pulley having a hub ring and a flyring, the hub ring and flyring being associated together, concentrically adjacent to one another and radially spaced apart, with a first spring body that is disposed in a gap formed by the interposed space. A belt pulley is connected to the hub ring in a rotationally elastic manner via a second spring body. The belt pulley and the second spring body are axially adjacent to one another.

7 Claims, 3 Drawing Sheets

UNCOUPLED BELT PULLEY

BACKGROUND OF THE INVENTION

The present invention relates to an uncoupled belt pulley having a hub ring and a flyring, the hub ring and flyring being concentrically arrayed across a radial gap. A first spring body is disposed in the gap formed by the interposed space and a belt pulley is connected to the hub ring in a rotationally elastic manner via a second spring body.

Belt pulleys of this kind, which are composed of a coupling mechanism and a torsional vibration damper, are generally known. Typically, the second spring body and the belt pulley are substantially arranged in one radial plane, and the second spring body is encircled around its external circumference by the belt pulley. A disadvantage of such a configuration is that because of structural space constraints, only comparatively small dimensions in the radial direction are available for the second spring body, due to its radial arrangement within the belt pulley, and thus the second spring body has only a comparatively low torsional elasticity and is exposed during its operation to undesirably high shear stresses that reduce its service life.

SUMMARY OF THE INVENTION

The present invention is directed to the problem of further developing a belt pulley of the general type noted above, such that even where unfavorable structural space conditions do not permit the second spring body inside the belt pulley to have adequate dimensions within the plane of the belt, a second spring body can be implemented that permits substantially greater dimensions in the radial direction if needed, and thus affords a greater torsional elasticity combined with comparatively low shear stresses.

In the present invention, the belt pulley and the second spring body are positioned so that they are axially spaced apart and adjacent to one another. In this context, the belt pulley is disposed axially on one side of the hub ring, and the second spring body is located axially on the other side of the hub ring. Because the belt pulley and the second spring body are assigned to be axially adjacent to one another, it is possible for the second spring body to have an outer diameter at least exactly as great as the outer diameter of the bearing arrangement for the belt pulley. Depending on the circumstances of the particular application, the outer diameter of the second spring body may even be greater than the outer diameter of the belt pulley. Configuring the uncoupled belt pulley in accordance with the present invention, enables it to be excellently adapted to the circumstances of the particular application. Adverse effects upon function and/or service life due to inadequate size of the second spring body are thereby precluded.

According to one advantageous embodiment, provision may be made for the second spring body to be arranged on the side of the hub ring facing the drive mechanism. The utility of this approach is evident when considered in the context of a motor vehicle, in which the uncoupled belt pulley is driven by the crankshaft of the internal combustion engine, the belt pulley being provided to drive secondary groups. The present design affords good accessibility to the belt pulley on the side of the hub ring facing away from the drive mechanism, which is of considerable advantage.

The hub ring may be provided with a substantially C-shaped form open in the axial direction, in which the second spring body is disposed. This radial protrusion, which extends in the axial direction, is provided with at least one perforation, which extends in the circumferential direction and which itself is penetrated by at least one stop catch extending in the axial direction on the belt pulley. The stop catch is attached in a rotation-proof manner to the outer circumference of the second spring body and, in each instance, is assigned to be adjacent, with spacing, to the boundaries on the circumferential side of the perforation. One preferably uses three stop catches, which are distributed uniformly in the circumferential direction, and which penetrate a corresponding number of arcuate slots. In the uncoupled belt pulley entailed by the manufacturing process, the stop catches are preferably positioned, in the circumferential direction, midway between the boundaries on the circumferential side of the arcuate slots. Also, the stop catches do not contact the circumferential-side boundaries of the arcuate slots during systematic operation of the uncoupled belt pulley. The stop catches, which engage in the arcuate slots, constitute a backup safety mechanism in the event that the second spring body fails.

If, for example, the second spring body is damaged and/or destroyed during operation of the uncoupled belt pulley, the stressed belt pulley continues to provide good emergency running characteristics. If the second spring body is destroyed, the stop catches move to a boundary of the perforation, the belt pulley then being entrained by the hub ring because of the form-locking connection of the stop catches with the boundaries of the arcuate slots. Accordingly, contact between the stop catches and the boundaries on the circumferential side of the arcuate slots only occurs in response to extreme excursions.

On the side facing away from the drive mechanism, the radial protrusion may be provided with an axial protrusion which extends in the axial direction and on which the belt pulley is mounted relatively torsionally. The belt pulley is preferably braced against the axial protrusion via a friction (so-called "slide") bearing. The use of the friction bearing on the axial protrusion, which is configured as a supporting flange for the belt pulley, keeps the radial extent of the unit composed of the axial protrusion, friction bearing and belt pulley relatively small, compared to the use of a roller bearing arrangement.

To ensure low mechanical stress on the second spring body as well as high rotational elasticity combined with only low shear stresses, it is advantageous for the perforation to be disposed radially outside the axial protrusion. Large radial extensions of the second spring body may thus be achieved. Viewed in the radial direction, the C-shaped form of the hub ring is in this case almost entirely filled up by the second spring body.

The second spring body is preferably adhesively enclosed radially, on the inside and the outside, by one ring each of hard and ductile material, preferably a metallic material, the inner ring being pressed against the radially internal boundary wall of the hub ring, and the outer ring being provided with a recess on the external side for receiving the stop catch in a rotationally fixed, force-locking and/or form-locking manner. The second spring body is preferably vulcanized with the rings adjacent to it in the radial direction. The second spring body and the two rings constitute a preassembled unit which may, for example, be pressed or shrunk onto the internal boundary wall of the hub ring. To produce a rotationally elastic connection between the belt pulley and the second spring body, the stop catches configured as a single piece with the belt pulley are attached to the outer ring in a rotation-proof manner.

It is preferable that the first and second spring bodies each be made of an elastomer material of a different characteristic that is, thus, well adapted to the particular application. The Shore A hardness of the second spring body is distinctly less than the Shore A hardness of the first spring body.

The hub ring is preferably produced as a metal casting and is integrally formed in one piece with and of the same material as the axial protrusion. Such a configuration provides a simple construction of the belt pulley involving few parts, which is an advantage in terms of production engineering and ease of assembly. Variant configurations, in which the axial protrusion is produced as a separate single part and is then joined to the hub ring, are also within the scope of this invention.

BRIEF DESCRIPTION OF THE DRAWINGS

An exemplary embodiment of an uncoupled belt pulley constructed according to the principles of the invention is described in the figures.

DETAILED DESCRIPTION OF THE INVENTION

Figure 1:
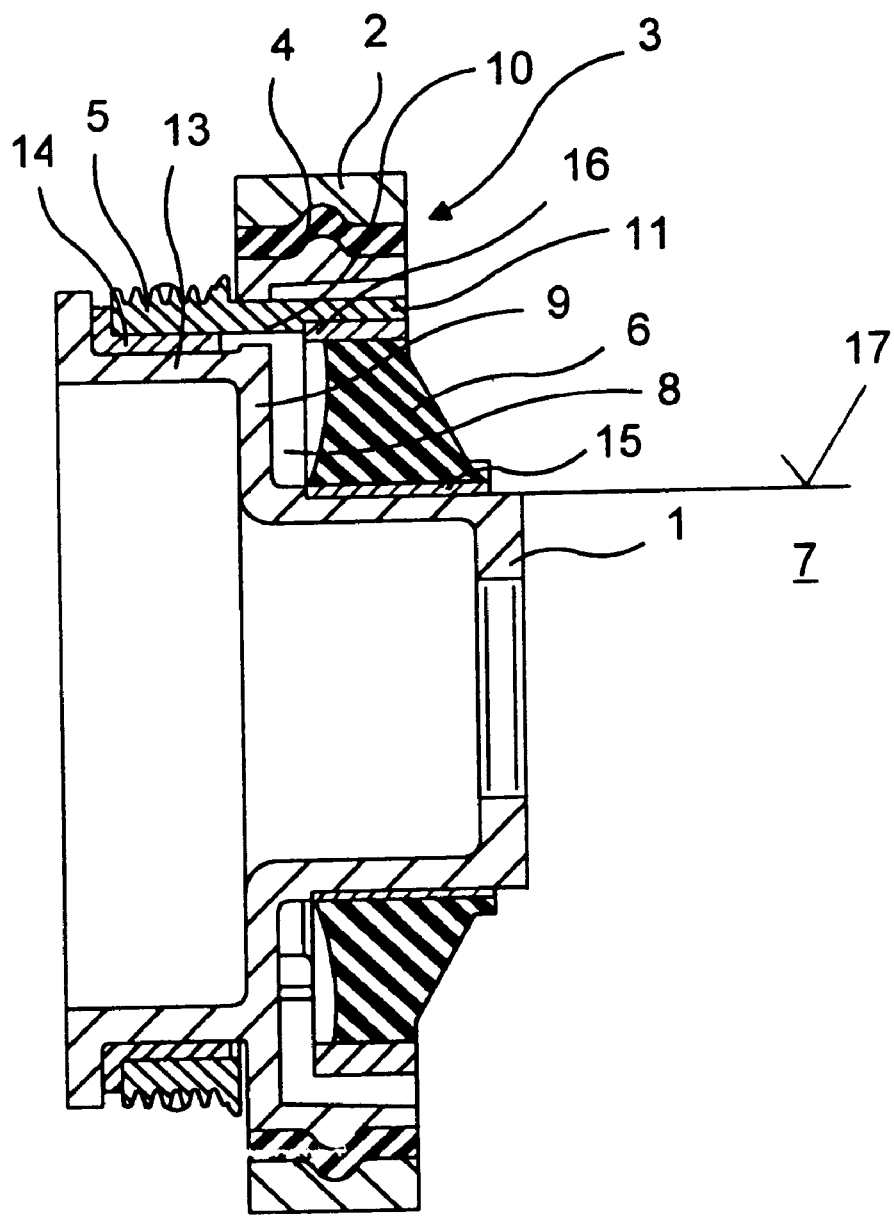
FIG. 1 is a cross-sectional view of an uncoupled belt pulley constructed according to the principles of the invention.
Figure 2:
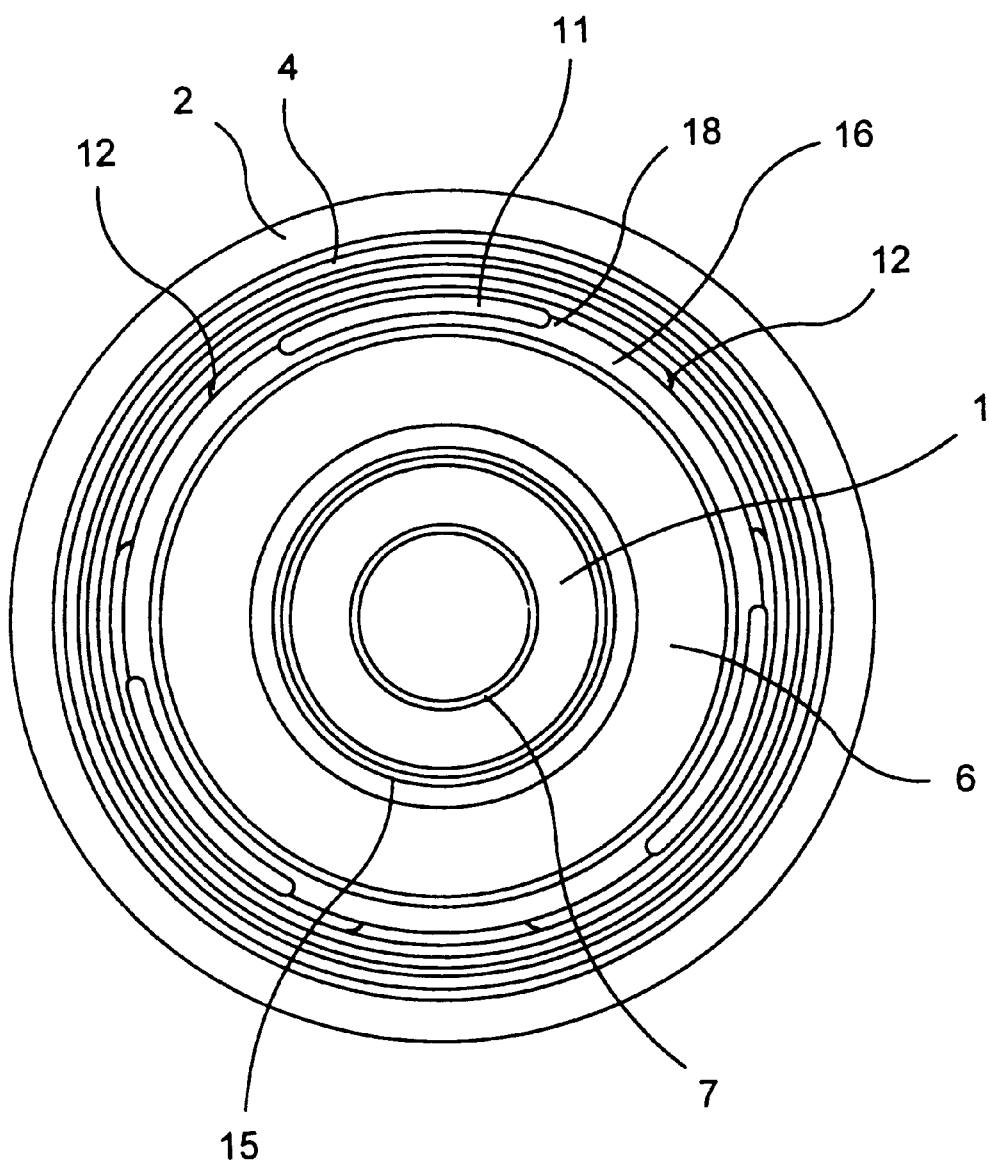
FIG. 2 shows the belt pulley of FIG. 1 as viewed from the right side.
Figure 3:
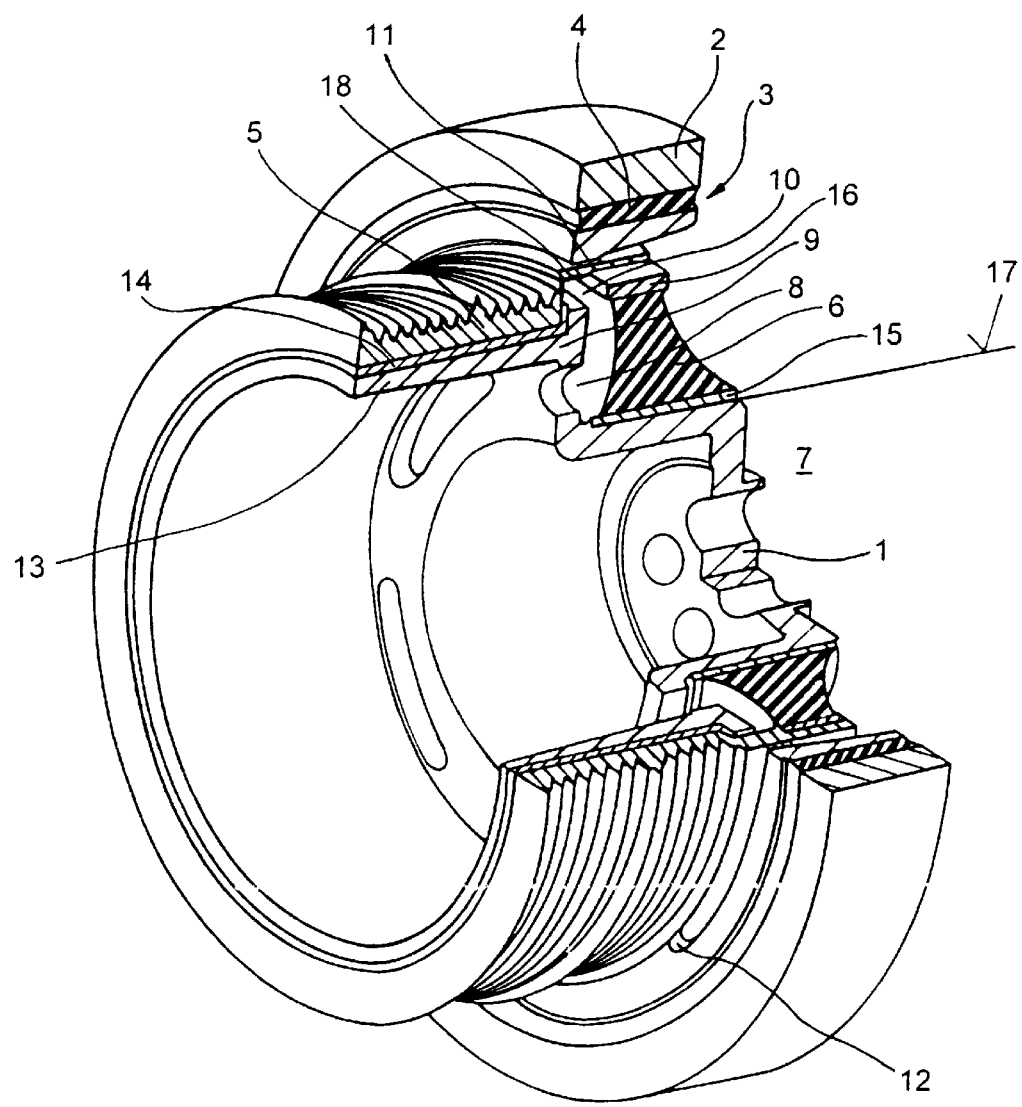
FIG. 3 presents a perspective view, partially in section, of the belt pulley shown in FIGS. 1 and 2.

FIGS. 1–3 show an exemplary embodiment of an uncoupled belt pulley according to the present invention, composed substantially of a coupling mechanism and a torsional vibration damper. A flyring 2 encircles hub ring 1 and is radially spaced apart from it, first spring body 4 of the torsional vibration damper being disposed in gap 3 formed by the interposed space. The torsional vibration damper is connected by the second spring body 6 of the coupling to belt pulley 5, with belt pulley 5 and second spring body 6 being arranged so that they are axially adjacent to one another. Because second spring body 6 has a large radial extent, with the outer circumference of second spring body 6 substantially having the same radial extent as belt pulley 5, undesirably high shear stresses within second spring body 6 are reliably avoided even at high torsional amplitudes of belt pulley 5 relative to hub ring 1.

In the exemplary embodiment shown here, hub ring 1 has a substantially C-shaped form 8 which is open axially in the direction of drive mechanism 7 and inside which second spring body 6 is disposed. In radial protrusion 9 in this exemplary embodiment, provision is made for three arcuate slots 10, which are distributed uniformly in the circumferential direction and extend in the circumferential direction, and which are penetrated by three stop catches 11 on belt pulley 5, which are distributed uniformly in the circumferential direction and extend in the axial direction. In the exemplary embodiment shown here, the uncoupled belt pulley is represented in such a way that stop catches 11 are positioned midway between boundaries 12 of arcuate slots 10 so that they do not ordinarily penetrate the arcuate slots.

The second spring body 6 is vulcanized on its internal side together with an inner ring 15, and on the external side with an outer ring 16, the rings being made of a metallic material. Inner ring 15 is pressed onto inner bounding wall 17 of hub ring 1 and is thus attached in a rotation-proof manner to hub ring 1. Outer ring 16 has on its outer circumferential side three recesses 18 distributed uniformly in the circumferential direction and having a form congruent with that of the stop catches 11. By this form-locking connection between stop catches 11 and outer ring 16, the belt pulley 5 is disposed in a rotationally elastic manner to hub ring 1.

Belt pulley 5 in this exemplary embodiment is produced as a casting and is provided with support via an is axial protrusion 13 on the side of radial protrusion 9 facing away from drive mechanism 7, the protrusion being integrally formed in one piece with and of the same material as hub ring 1. Axial protrusion 13 is encircled on its outer circumferential side by belt pulley 5 and is radially spaced apart from it, a friction bearing 14 being disposed in the gap formed by the interposed space.

In FIG. 2 stop catches 11 inserted into recess 18 on outer ring 16 are readily recognizable, as is their form-locking connection, along with boundaries 12 on the circumferential side of arcuate slots 10.

What is claimed is:

1. An uncoupled belt pulley comprising:

a hub ring having a radial protrusion extending in the radial direction; a flyring that is concentric with the hub ring, the hub ring and flyring being radially spaced apart from one another defining a gap therebetween;

a first spring body being disposed in the gap; and a belt pulley connected to the hub ring in a rotationally elastic manner via a second spring body disposed on a side of the hub ring, wherein the belt pulley and the second spring body are located axially adjacent to one another;

wherein the radial protrusion is provided with an axial protrusion which extends in the axial direction and on which the belt pulley is mounted relatively torsionably.

2. The belt pulley as defined by claim 1, wherein the belt pulley is supported on the axial protrusion via a friction bearing.

3. The belt pulley as defined by claim 1, wherein the first and second spring bodies are each made of an elastomer material.

4. The belt pulley as defined by claim 1, wherein the hub ring is produced as a metal casting and is integrally formed in one piece with and of the same material as the axial protrusion.

5. An uncoupled belt pulley comprising:

a hub ring;

a flyring that is concentric with the hub ring, the hub ring and flyring being radially spaced apart from one another defining a gap therebetween;

a first spring body being disposed in the gap; and a belt pulley connected to the hub ring in a rotationally elastic manner via a second spring body, wherein the belt pulley and the second spring body are located axially adjacent to one another, wherein the hub ring has a substantially C-shaped form open in the axial direction, inside which the second spring body is disposed, and further comprising a radial protrusion extending in the radial direction, the radial protrusion providing at least one perforation extending in the circumferential direction and penetrated by at least one stop catch extending in the axial direction on the belt pulley, the stop catch being attached in a rotation-proof manner to the outer circumference of the second spring body and is in each instance associated with, adjacent to and spaced apart from the boundaries on the circumferential side of the perforation.

6. The belt pulley as defined by claim 5, wherein the perforation is disposed radially outside the axial protrusion.

7. An uncoupled belt pulley comprising:

a hub ring;

a flyring that is concentric with the hub ring, the hub ring and flyring being radially spaced apart from one another defining a gap therebetween;

a first spring body being disposed in the gap; and a belt pulley connected to the hub ring in a rotationally elastic manner via a second spring body, wherein the belt pulley and the second spring body are located axially adjacent to one another, wherein the second spring body is adhesively encircled radially, on the inside and the outside, by one ring each of hard and ductile material, the inner ring being pressed against the radially internal boundary wall of the hub ring and the outer ring being provided with a recess on the external side for receiving the stop catch in a rotationally fixed, force-locking and/or form-locking manner.

\* \* \* \* \*